(12) United States Patent
Shrum (10) Patent No.: US 11,586,633 B2
(45) Date of Patent: Feb. 21, 2023

(54) SECONDARY TAGGING IN A DATA HEAP

(71) Applicant: Acxiom LLC, Conway, AR (US)

(72) Inventor: Thomas Lawrence Shrum, Conway, AR (US)

(73) Assignee: Acxiom LLC, Conway, AR (US)

(*) Notice: Subject to any disclaimer, the term of this patent is extended or adjusted under 35 U.S.C. 154(b) by 407 days.

(21) Appl. No.: 16/708,056

(22) Filed: Dec. 9, 2019

(65) Prior Publication Data

US 2021/0064625 A1 Mar. 4, 2021

Related U.S. Application Data (60) Provisional application No. 62/891,679, filed on Aug. 26, 2019, provisional application No. 62/891,689, filed on Aug. 26, 2019, provisional application No. 62/891,683, filed on Aug. 26, 2019.

(51) Int. Cl.
| | |
|---|---|
| *G06F 16/2455* | (2019.01) |
| *G06F 16/906* | (2019.01) |
| *G06F 16/22* | (2019.01) |
| *G06F 16/242* | (2019.01) |
| *G06F 40/117* | (2020.01) |
| *G06Q 30/0201* | (2023.01) |
| *H04L 67/561* | (2022.01) |

(52) U.S. Cl.
CPC .... *G06F 16/24568* (2019.01); *G06F 16/2246* (2019.01); *G06F 16/244* (2019.01); *G06F 16/906* (2019.01); *G06F 40/117* (2020.01); *G06Q 30/0201* (2013.01); *H04L 67/561* (2022.05)

(58) Field of Classification Search
CPC .......... G06F 16/24568; G06F 16/2246; G06F 16/244; G06F 16/906; G06F 40/117; G06Q 30/0201; H04L 67/561
See application file for complete search history.

(56) References Cited

U.S. PATENT DOCUMENTS

| | | | |
|---|---|---|---|
| 7,882,077 B2 * | 2/2011 | Gokhale | G06F 16/2372 707/673 |
| 8,364,680 B2 | 1/2013 | Bilbrey | |
| 8,397,285 B2 | 3/2013 | Balakrishnan et al. | |

(Continued)

FOREIGN PATENT DOCUMENTS

WO 2019133928 A1 7/2019

OTHER PUBLICATIONS

"How Custom Tagging Creates a Successful Data Management Strategy," Data Dynamics, Inc., retrieved Jul. 17, 2019.

(Continued)

*Primary Examiner* — Cam Y T Truong (57) ABSTRACT

A method of searching data being directed into a data heap looks for a predetermined element and then tags the data per the found element. The tags are applied by data heap tagging applications or "HeapTagApps" (HTAs), which are small, quickly executing software applications that are each focused on the tagging of data that includes a particular element in order to make the identification process rapid. Multiple HTAs in one or both of horizontal and vertical configurations may be constructed in order to provide any necessary level of speed or take full advantage of an available hardware configuration.

25 Claims, 5 Drawing Sheets

(56) References Cited

U.S. PATENT DOCUMENTS

| | | | |
|---|---|---|---|
| 8,595,234 B2 | 11/2013 | Siripurapu et al. | |
| 8,769,576 B2 | 7/2014 | Burkitt et al. | |
| 8,935,204 B2 | 1/2015 | Peto et al. | |
| 9,098,531 B2 | 8/2015 | Desmond et al. | |
| 9,225,793 B2 | 12/2015 | Dutta et al. | |
| 9,256,667 B2 | 2/2016 | Koudas et al. | |
| 9,270,515 B1 | 2/2016 | Postelnicu et al. | |
| 9,286,295 B2 | 3/2016 | Beadles | |
| 9,465,856 B2 | 10/2016 | Branton et al. | |
| 9,524,282 B2 | 12/2016 | Algreatly | |
| 9,710,539 B2 | 7/2017 | Dey et al. | |
| 9,898,748 B1 | 2/2018 | Taylor et al. | |
| 10,097,432 B2 | 10/2018 | Stevens et al. | |
| 10,191,974 B2 | 1/2019 | Indeck et al. | |
| 10,248,719 B2 | 4/2019 | Sharma et al. | |
| 10,250,640 B2 | 4/2019 | Redlich et al. | |
| 2004/0221120 A1* | 11/2004 | Abrashkevich | G06F 12/023 711/170 |
| 2006/0253503 A1 | 11/2006 | Barrs et al. | |
| 2007/0250901 A1 | 10/2007 | McIntire et al. | |
| 2008/0010294 A1 | 1/2008 | Norton et al. | |
| 2008/0270254 A1* | 10/2008 | Patoureaux | G06Q 10/047 705/5 |
| 2008/0288347 A1 | 11/2008 | Sifry | |
| 2009/0251277 A1 | 10/2009 | O'Hara et al. | |
| 2012/0124090 A1* | 5/2012 | Matz | G06Q 30/02 707/780 |
| 2013/0117464 A1 | 5/2013 | Brown et al. | |
| 2014/0019555 A1 | 1/2014 | Cai et al. | |
| 2014/0337375 A1* | 11/2014 | Yue | G06F 16/2255 707/769 |
| 2015/0234927 A1* | 8/2015 | Cao | G06F 16/907 707/722 |
| 2016/0134667 A1 | 5/2016 | Suresh et al. | |
| 2016/0179849 A1* | 6/2016 | Dubois | G06F 16/211 707/803 |
| 2016/0210657 A1 | 7/2016 | Chittilappilly et al. | |
| 2016/0299977 A1 | 10/2016 | Hreha | |
| 2017/0013127 A1 | 1/2017 | Xue et al. | |
| 2019/0080354 A1 | 3/2019 | Booker et al. | |
| 2019/0190908 A1* | 6/2019 | Shen | H04L 63/0861 |
| 2020/0007455 A1* | 1/2020 | Chhabra | G06F 21/6218 |

OTHER PUBLICATIONS

"TagApp—Apps on Google Play," retrieved Jul. 16, 2019 (Jan. 16, 2016).

Nanculef et al., "Efficient Classification of Multi-Labelled Text Streams by Clashing," arXiv, Apr. 12, 2016.

Atkinson et al., "Near Real Time Information Mining in Multilingual News," WWW 2009 MADRID!, Apr. 23, 2009.

Bharti et al., "Sarcastic Sentiment Detection in Tweets Streamed in Real Time: A Big Data Approach," Digital Comm. and Networks 2 (2016) 108-121 (Aug. 1, 2016).

"Event Driven Feeds," Bloomberg Professional Services, retrieved Jul. 17, 2019.

Menon et al., "Fast ASR-Free and Almost Zero-Resource Keyword Spotting Using DTW and CNNs for Humanitarian Monitoring," arXiv, Jun. 25, 2018.

"Marketing Getting Started," Heap, retrieved Jul. 16, 2019.

"Hashtags for Instagram—Apps on Google Play," retrieved Jul. 16, 2019 (Dec. 1, 2018).

International Search Report and Written Opinion for Int'l App. No. PCT/US2019/065252 (dated Feb. 28, 2020).

* cited by examiner

SECONDARY TAGGING IN A DATA HEAP

CROSS-REFERENCE TO RELATED APPLICATIONS

This application claims the benefit of US Provisional Patent Application Nos. 62/891,679, 62/891,683, and 62/891,689, each of which was filed on Aug. 26, 2019. Each of these applications is incorporated by reference as if fully set forth herein.

STATEMENT REGARDING FEDERALLY SPONSORED RESEARCH OR DEVELOPMENT

Not applicable.

BACKGROUND OF THE INVENTION

Streams of electronic data are used in many applications today. As the quantity of available data continues to increase in many fields, more advanced methods are required for receiving, storing, and cataloging the data. There is a particularly strong need for new methods of cataloging data in applications where the "freshness" of the data is a significant aspect of the value of the data. For example, data indicating that a particular consumer is "in market" for a new truck must be acted on quickly, or the customer may have already made a purchase from a competitor before the data is fully processed, and thus the opportunity will be missed. Another example is data about a consumer's location, since this may change in an extremely short timeframe. For example, it may be valuable to know that a consumer is standing near a particular retailer or driving toward a particular coffee shop, in which case marketing messages from these retailers may be more effective if they reach the consumer before the opportunity has passed. Thus although these kinds of data may be highly valuable, they become worthless if the data cannot be processed quickly enough to act before the opportunity passes. If one waits to use the data until after all of the processing, writing of data to storage, and formatting and cataloging of data has been complete as in traditional data processing systems, then it may be too late to meaningfully use the data and the value of the data has been lost.

BRIEF SUMMARY OF THE INVENTION

The present invention is directed to a method and system by which an enterprise may scan data after it arrives over a network but before it is fully formatted in order to look for a predetermined single data element, and then tags the data per the found information. The method is referred to herein as "secondary" tagging because the tagging takes place after the data is received and stored, but before it is formatted into a data structure such as a data heap. The tags are applied by data heap tagging applications or "HeapTagApps" (HTAs), which are a set of small, quickly executing software applications that are each focused on the tagging of a particular data element in order to make the identification process as rapid as possible. In certain embodiments, the HTAs are run against the data after it is stored and written to a data structure maintained by the enterprise, but before all data for a given file are written to that data structure. Because the tags are applied to the data while the data structure is still being filled, rather than after the complete data structure has been constructed, information from the tag will be available very quickly, enabling the enterprise to act very quickly in response to the tags, rather than waiting for the completion of the relevant data structure. In this way, the process and system allows very quick action to be taken in order to maximize the usefulness of the data, in some cases allowing for a real-time response.

These and other features, objects and advantages of the present invention will become better understood from a consideration of the following detailed description in conjunction with the drawings.

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In the first step of a process according to an implementation of the invention, a variety of data is sourced from many different potential sources. These sources may include the Internet (such as from companies like Amazon, WhatsApp, and Instagram); Internet of Things (IoT) devices such as web cameras, refrigerators, and home automation devices; or from customer data files. As the data streams in over a network, it is written to storage by the enterprise. The enterprise then begins organizing the data using a data structure such as a heap. For purposes herein, a heap may be considered as a tree-based data structure, in particular a binary tree, in which a key value in a parent node is always greater than or equal to the key value in a corresponding child node (a max tree) or always less than or equal to the key value in such corresponding node (a min tree). Although such data structures are useful in a wide variety of applications, constructing the heap takes processing time, which would delay the ability to use the incoming data if the data were not placed into use until all data had been written into the data structure. In implementations of the present invention, data heap tagging applications ("HeapTagApps" or HTAs) scan the data as each item of data is being added to the heap data structure. Each of the one or more HTAs are focused on single elements (e.g., data of birth, purchase amount, etc.), and each peruse the items of data for that element alone as those items of data are added to the heap. Upon finding the element each HTA is looking for, it tags the data appropriately and continues to peruse other data being added to the heap. For example, suppose an item of data being added to a heap contains both the element "date of birth" and the element "purchase amount." The HTA that is looking for "date of birth" will tag that element to indicate that date of birth was found, and the HTA that is looking for the element "purchase amount" will also tag that same element to indicate that purchase amount was found. With enough different HTAs sifting through the items of data as they are added to the heap, a great deal of information may be known about the data quickly, without waiting to complete the entire heap data structure. The tagged data may be sent directly to a marketing process for use of the data in real time, or may be stored in a tagged element database in order to make it acceptable to other processes.

HTAs can be scaled in a manner that makes them more efficient. For example, HTAs may be scaled vertically by running the HTAs on multiple processors or multiprocessor architectures comprising multiple cores. In addition, HTAs may be scaled horizontally by having multiple different HTAs running simultaneously. Of course even greater efficiency can be achieved by scaling the HTAs both vertically and horizontally, thereby handling data volumes of any size efficiently by scaling up the HTAs in a manner corresponding with the data volume.

An HTA should be scaled horizontally (i.e., another app identical in function to the original begins to function) whenever the ratio of time performing work to passed time becomes greater than 1:2. For example, an app would scale whenever it takes 1 second performing its task over a period of 2 seconds.

An HTA should be scaled vertically (e.g., another computer having identical software installed to the original begins to function) whenever the estimated average time for any of memory, CPU, disk, or I/O buses to achieve 67% of maximum is less than the time it takes to scale (TTS). For example, if TTS is 5 minutes, then a computer would scale when 23% of total memory is being used and memory usage is increasing on average by 11% per minute over the past minute (time to 67% of memory is 4 minutes while TTS is 5 minutes).

An HTA should vertically de-scale (e.g., a computer would remove itself from the pool of computing resources) whenever doing so would not cause an HTA scale event, either horizontally or vertically.

HTAs may be applied where data would need to be processed immediately in order to reap the greatest value from that data. For instance, name and address data could be used to identify consumers in advance of other processing.

Figure 1:
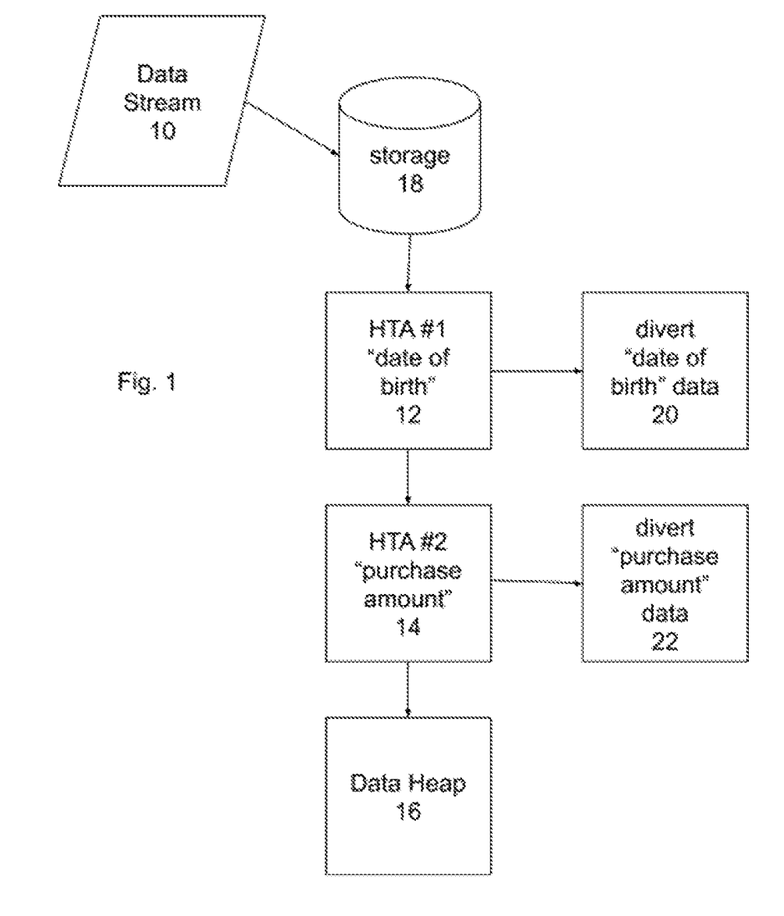
FIG. 1 is an exemplary data flow diagram according to an implementation of the invention showing two different data heap tagging applications or "HeapTagApps" (HTAs) functioning to tag incoming data.

Referring now to FIG. 1, a flow chart illustrates the steps in the process for making use of certain implementations of the present invention. A connection is made to data stream 10, and the unstructured data is written to storage 18 by the enterprise. In this case, data stream 10 is electronic messages, but the data stream can be any type of electronic information in other implementations. The data is passed to a controller or controllers that host multiple HTAs. HTA #1, at block 12, searches the stream for the target element, in this example being the "date of birth" element. If the element is found, then the data is tagged with the "date of birth" tag, and optionally may be diverted from the main data stream (or a copy diverted from the main data stream) in order to immediately or later make use of this information at step 20. Multiple different HTAs may exist on the same computer core. HTA #2 at block 14 performs a similar process for the "purchase amount" element. The "purchase amount" data may be diverted at step 22. All of this processing takes place before the data from data stream 10 is added to the heap data structure at data heap 16. Although two HTAs each for a different data element are shown, it will be understood that any number of HTAs could be employed in various alternative implementations.

Figure 2:
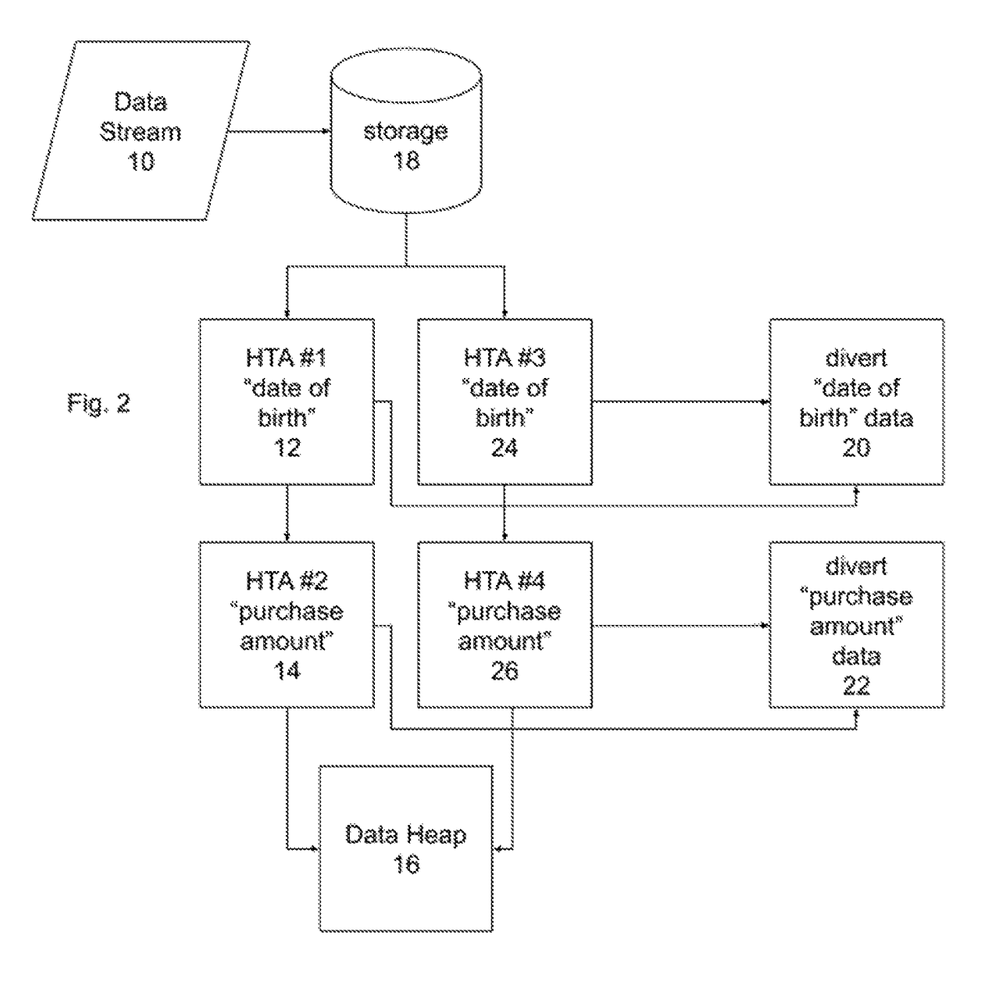
FIG. 2 is an exemplary data flow diagram according to an implementation of the invention using vertically scaled HTAs to tag incoming data.

Referring to FIG. 2, a different arrangement is shown where the HTAs are scaled vertically for greater efficiency. In this case, data stream 10 is sent to storage media 18, but then is divided into two parallel streams to facilitate parallel processing. In this model, there may be multiple compute cores that each run an instantiation of the same HTA, as well as multiple different HTAs running on the same compute core. New HTA #3 at block 24, HTA #4 at block 26, provide parallel searching for the "date of birth" and "purchase amount" elements, respectively. All four HTAs optionally divert data once tagged as explained above with reference to FIG. 1, in this case HTAs #1 and #3 diverting "date of birth" element data at step 20, and HTAs #2 and #4 diverting "purchase amount" element data at step 22. As in the example of FIG. 1, all of this processing takes place before the data from data stream 10 is stored or formatted in data heap 16. It may be seen that by arranging the HTAs in this manner and given a hardware platform with sufficiently parallel resources, the system can keep up with the rate of the data flow no matter how fast the data from data stream 10 comes in. The degree to which the processing is scaled vertically therefore can be a function of how fast the corresponding data stream 10 will operate.

Figure 3:
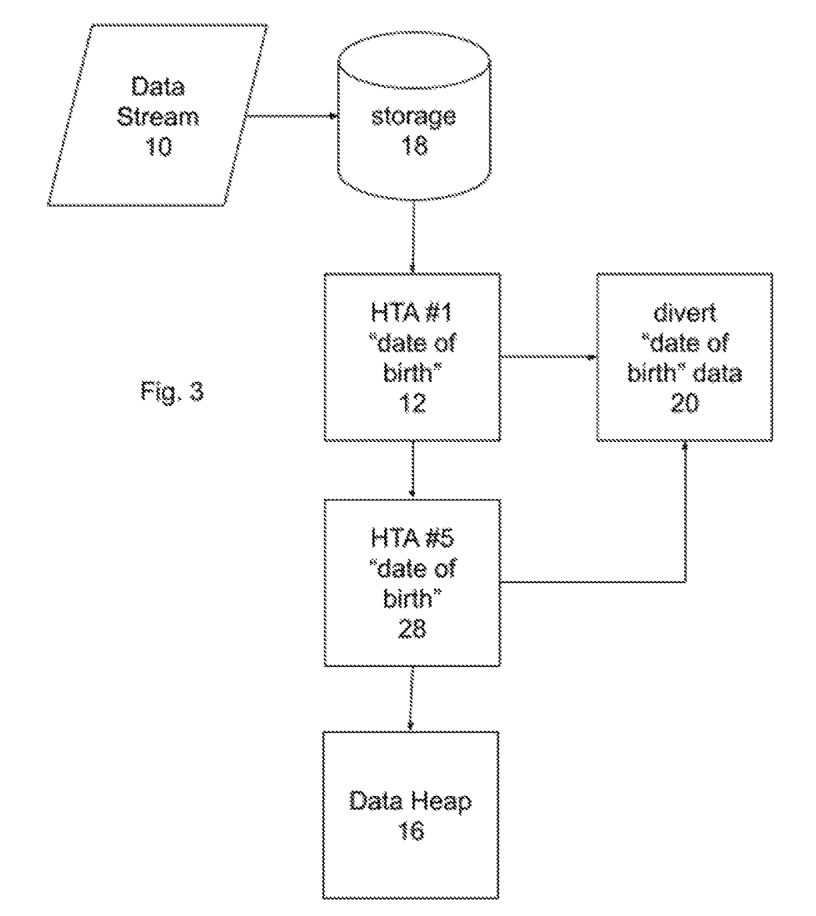
FIG. 3 is an exemplary data flow diagram according to an implementation of the invention using horizontally scaled HTAs to tag incoming data.

Referring to FIG. 3, a different arrangement is shown in which the HTAs are scaled horizontally for greater efficiency. In this case, data stream 10 sends data to storage 18, and then the items of data are passed through two different HTAs for the "date of birth" element, blocks 12 and 28, which are aligned in a "horizontal" fashion, that is, such that they are each searching data from the same data stream 10 at the same time, before the data is formatted at data heap 16. In one implementation from this example, each HTA may search a subset of the data elements as the data stream passes through, and thus all elements are searched in the data stream but the data stream may be searched more quickly as a whole. Each of the two HTAs may divert data tagged for the "date of birth" element at block 20. As noted above, an arrangement that combines the features shown in FIG. 2 and FIG. 3 is another embodiment of the invention, which may produce the greatest efficiency. Thus the design may take full advantage of multiple compute cores each running an instantiation of the same HTA, and each compute core may run either a single HTA or an array of the same or different HTAs, in order to adequately inspect the data stream so that all data are appropriately tagged. Either of the versions of FIG. 2 and FIG. 3, or the combination thereof, may be scaled to any arbitrary level to manage as large of a data feed 10 as is needed and as many different types of tags as may be useful for any particular application.

While data continues to be sent to data heap 16 for formatting, HTA-tagged data elements may be sent via an application programming interface (API) for immediate processing, ahead of the time at which the data is fully formatted at data heap 16. Alternative embodiments may use a method other than an API in order to begin the processing of data before being written to storage at the enterprise, depending upon the particular application to which the various embodiments of the method and system is being applied.

Figure 4:
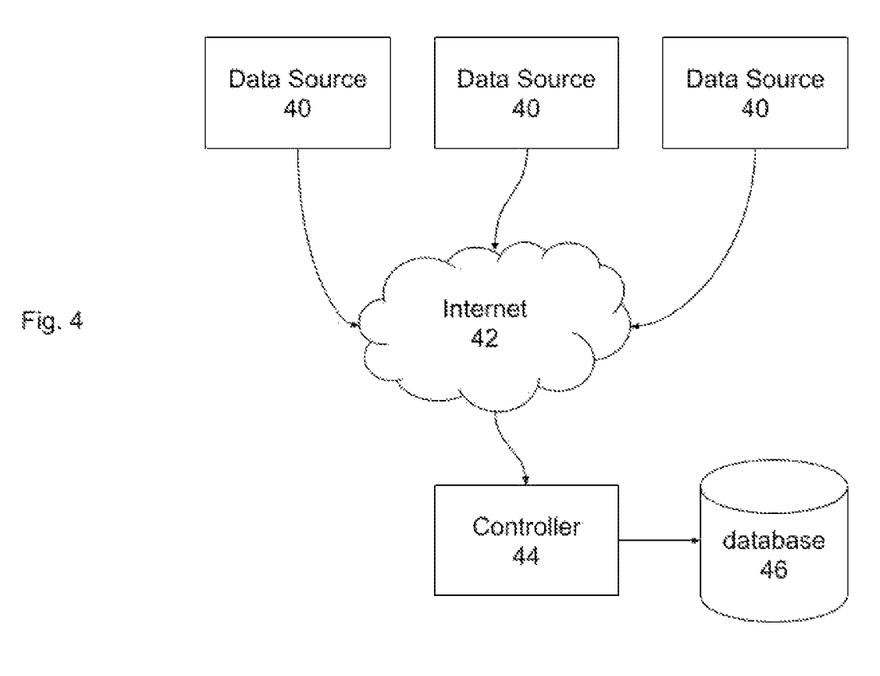
FIG. 4 is a diagram of a system according to an implementation of the invention.

The elements that make up a system according to an implementation of the invention are shown on FIG. 4. Multiple data sources 40 are connected to controller 44 over Internet 42. In this way, data is fed into the system as described previously. Controller 44 is where the processing of the data occurs. Controller 44 is in communication with storage 46, which is where the results of the processing are stored after formatting and cataloguing in data heap step 16.

Figure 5:
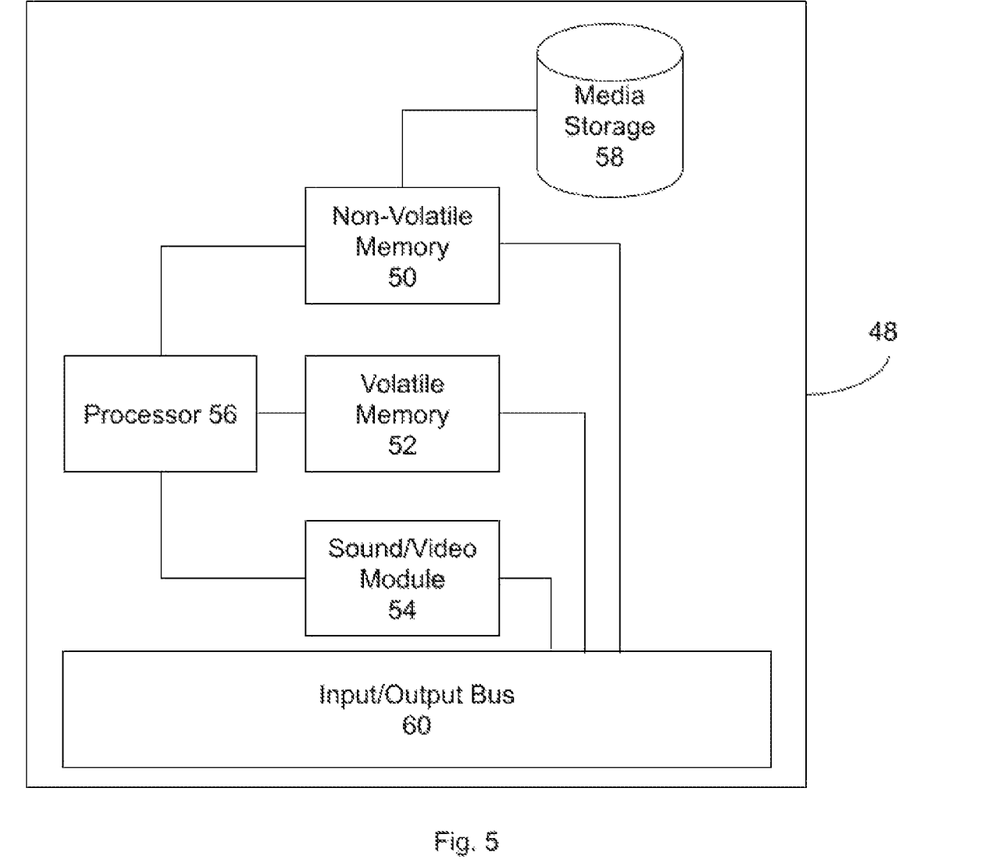
FIG. 5 is a diagram of a computing device according to an implementation of the invention.

A computing system 48 that may be used to implement controller 44, as shown in FIG. 5. Generally, computing system 48 may include digital storage such as a magnetic disk, an optical disk, flash storage, non-volatile storage, or other storage devices. Data and instructions may be stored in the digital storage such as in a database. The computing system 48 may have a processor 56 that is physically configured to best process executable instructions. It may also have an optional sound/video module 54, which operates to display video and play sound. The computing system 48 may also have volatile memory 52, such as solid-state RAM memory in one or more levels or caches, and non-volatile memory 50. There also may be an input/output bus 60 that transmits data and/or instructions to and from the various user input/output devices, such as a keyboard or monitor (not shown). The input/output bus 60 also may control communications with other devices, either through wireless or wired devices.

The storage 46 of FIG. 4 may be integrated into the media storage 58 of FIG. 5, or may be physically separate. The storage 46 may also be part of a cloud of computing devices and may be stored in a distributed manner across a plurality of computing devices.

The user devices, computers and servers described herein may be general purpose computers that may have, among other elements, a microprocessor; volatile and/or non-volatile memory; one or more mass storage devices (i.e., a hard drive); various user input devices, such as a mouse, a keyboard, or a microphone; and a video display system. The user devices, computers and servers described herein may be running on any one of many operating systems. The servers may be a cluster of web servers, which may each be supported by a load balancer that decides which of the cluster of web servers should process a request based upon the current request-load of the available server(s). The devices described herein may communicate via networks, including the Internet, WAN, LAN, Wi-Fi, other computer networks, and/or any combination of them. These may be implemented as wired and wireless conduits, including copper, fiber optic, microwaves, and other forms of radio frequency, electrical and/or optical communication techniques. It should also be understood that any network may be connected to any other network in a different manner. The interconnections between computing systems described here are examples. Any device described herein may communicate with any other device via one or more networks. The example embodiments may include additional devices and networks beyond those shown. Further, the functionality described as being performed by one device may be distributed and performed by two or more devices. Multiple devices may also be combined into a single device, which may perform the functionality of the combined devices.

Any of the software components or functions described in this application, may be implemented as software code or computer readable instructions that may be executed by at least one processor using any suitable computer language such as, for example, Java, C++, or Python.

The software code may be stored as a series of instructions or commands on a non-transitory computer readable medium, such as a random-access memory (RAM), a read-only memory (ROM), a magnetic medium such as a hard-drive or a floppy disk, or an optical medium such as a CD/DVD-ROM. Any such computer readable medium may reside on or within a single computational apparatus and may be present on or within different computational apparatuses within a system or network.

Generally speaking, a non-transitory computer readable medium may include electronic, magnetic, or optical media—e.g., disk or CD/DVD-ROM. The terms "tangible" and "non-transitory," as used herein, are intended to describe a computer-readable storage medium (or memory) excluding propagating electromagnetic signals, but are not intended to otherwise limit the type of physical computer-readable storage device that is encompassed by the phrase computer-readable medium or memory. For example, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a wired or wireless network.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included in the disclosure. When a range is mentioned herein, the disclosure is specifically intended to include all points in that range and all sub-ranges within that range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as presented in the following claims.

The invention claimed is:

1. A method for secondary tagging of data, comprising steps of:
 a. receiving, via a network, a data stream at a controller, wherein the data stream comprises a plurality of data elements being organized into a data heap, wherein the data heap comprises a binary tree in which a key value in each parent node of a plurality of parent nodes is always greater than or equal to a key value in a corresponding child node or always less than or equal to the key value in a corresponding node;
 b. applying a first data heap tagging application executed by a processor to a first data element of the data elements in the data stream, wherein the first data heap tagging application searches for a match to a first target element, wherein the applying the first data heap tagging application comprises appending one or more of a text string, a number, or a code to the first data element of the data elements;

c. if a match with the first target element is found by the first data heap tagging application, tagging the first data element of the data elements with a first tag;

d. applying a second data heap tagging application executed by a processor to a second data element of the data elements, wherein the second data heap tagging application searches for a match to a second target element, wherein the first target element and second target element are not a same, wherein the applying the second data heap tagging application comprises appending one or more of a text string, a number, or a code to the second data element of the data elements, wherein the second data heap tagging application is different from the first data heap tagging application;

e. if a match with the second target element is found by the second data heap tagging application, tagging the second data element of the data elements with a second tag, wherein the first tag and the second tag are not a same, wherein the applying the first data heap tagging application and the applying the second data heap tagging application are performed before each data element of the plurality of data elements in the data stream are organized into the data heap, wherein the steps (b) to (e) are performed before the data stream is catalogued and formatted into the data heap;

f. after the applying the first data heap tagging application and applying second data heap tagging application to the data elements in the data stream, storing the data stream into the data heap by sending the tagged first and second data elements from the data stream to the data heap via an application program interface.

2. The method of claim 1, making a copy of one data element of the data elements and sending the copy to an application programming interface or a tagged element database or both of an application programming interface and a tagged element database.

3. The method of claim 1, moving an element from the data stream such that such one of the data elements is not organized into the data heap.

4. The method of claim 1, further comprising steps of:
a. after receiving the data stream at the controller, dividing the data stream into first and second data streams, the first and second data streams contain a plurality of elements;
b. applying the first data heap tagging application to one of the data elements in the first data stream, and simultaneously applying a third data heap tagging application to one of the data elements in the second data stream, wherein the first and third data heap tagging applications search the first data stream and the second data stream for a match to the first target element;
c. if a first target element match is found by either the first or third data heap tagging applications, tagging one of the data elements with the first tag;
d. applying the second data heap tagging application to one of the data elements in the first data stream, and simultaneously applying a fourth data heap tagging application to one of the data elements in the second data stream, wherein the second and fourth data heap tagging applications search in the first data stream and the second data stream for a match to the second target element; and e. if a second target element match is found by either the second or fourth data heap tagging applications, tagging elements with the second tag.

5. The method of claim 4, further comprising running the first and third data heap tagging applications on different physical processors and running the second and fourth data heap tagging applications on different physical processors.

6. A method for secondary tagging of data, comprising the steps of:
a. receiving, via a network, a data stream at a controller, wherein the data stream comprises a plurality of elements being directed into a data heap, wherein the data heap comprises a binary tree in which a key value in each parent node of a plurality of parent nodes is always greater than or equal to a key value in a corresponding child node or always less than or equal to the key value in a corresponding node;
b. applying a first data heap tagging application executed on a physical processor to a first subset of the elements in the data stream, wherein the first data heap tagging application searches each element in the first subset for a match to a target element, wherein the applying the first data heap tagging application comprises appending one or more of a text string, a number, or a code to the first subset of the elements;
c. if the target element match is found by the first data heap tagging application, tagging the element in the first subset having the matched target element;
d. applying a second data heap tagging application executed on a physical processor to a second subset of the elements in the data stream, wherein the first subset of the elements and the second subset of the elements are exclusive of each other, and wherein the second data heap tagging application searches each element in the second subset for a match to the target element, wherein the applying the second data heap tagging application comprises appending one or more of a text string, a number, or a code to the second subset of the elements, the first data heap tagging application is different from the second data heap tagging application;
e. if the target element match is found by the second data heap tagging application, tagging the element in the second subset having the matched target element, wherein the applying the first data heap tagging application and applying second data heap tagging application are performed before each data element of the plurality of elements in the data stream are organized into the data heap, wherein the steps (b) to (e) are performed before the data stream is catalogued and formatted into the data heap; and
f. after the applying the first data heap tagging application and the applying second data heap tagging application to the data stream, storing each element in the data stream into the data heap by sending the tagged elements from the data stream to the data heap via an application program interface.

7. The method of claim 6, further comprising step of running the first and second data heap tagging applications on different physical processors.

8. One or more non-transitory computer readable storage media, having computer-executable instructions embodied thereon, wherein when executed by at least one processor, the computer-executable instructions cause the at least one processor to:
a. receive, via a network, a data stream at a controller, wherein the data stream comprises a plurality of elements being directed into a data heap, wherein the data heap comprises a binary tree in which a key value in each parent node of a plurality of parent nodes is always greater than or equal to a key value in a corresponding child node or always less than or equal to the key value in a corresponding node;

b. apply a first data heap tagging application to a first element of the elements to search for a match to a first target element, wherein the applying the first data heap tagging application comprises appending one or more of a text string, a number, or a code to the first element of the elements;

c. if the first target element match is found by the first data heap tagging application in the elements, tag the first element having the matched first target element with a first tag;

d. apply a second data heap tagging application to a second element of the elements to search for a match to a second target element, wherein the first target element and second target element are not a same, wherein the applying the second data heap tagging application comprises appending one or more of a text string, a number, or a code to the second element of the elements, wherein the first data heap tagging application is different from the second data heap tagging application;

e. if the second target element match is found in the elements y the first data heap tagging application, tag the second element having the matched second target element with a second tag, wherein the applying the first data heap tagging application and the applying second data heap tagging application are performed before each data element of the plurality of elements in the data stream are organized into the data heap, wherein the steps (b) to (e) are performed before the data stream is catalogued and formatted into the data heaps; and f. after the applying the first data heap tagging application and the applying second data heap tagging application to the data stream, store the data stream into the data heap by sending the tagged first and second elements from the data stream to the data heap via an application program interface.

9. The storage media of claim 8, wherein the computer-executable instructions cause the one or more processors to make a copy of one of the elements and send the copy of one of the elements to application programming interface or a tagged element database or both of an application programming interface and a tagged element database.

10. The storage media of claim 8, wherein the computer-executable instructions cause the one or more processors to move one of the elements from the data stream such that the element is not stored in the data heap.

11. The storage media of claim 8, wherein the computer-executable instructions further cause the one or more processors to:

a. after receiving the data stream at the controller, divide the data stream into first and second data streams, wherein first and second data streams contain a plurality of elements;

b. apply the first data heap tagging application to one of the elements in the first data stream, and simultaneously apply a third data heap tagging application to one of the elements in the second data stream, wherein the first and third data heap tagging applications search each element in the first data stream for a match to the first target element;

c. if a first target element match is found by either the first or third data heap tagging applications, tag the element having the matched first target element with a first tag;

d. apply the second data heap tagging application to one of the elements in the first data stream, and simultaneously apply a fourth data heap tagging application to one of the elements in the second data stream, wherein the second and fourth data heap tagging applications search in the second data stream for a match to the second target element; and e. if a second target element match is found by either the second or fourth data heap tagging applications, tag the element having the matched second target element with a second tag.

12. The storage media of claim 11, wherein the computer-executable instructions further cause the one or more processors to run the first and third data heap tagging applications on different physical processors and to run the second and fourth data heap tagging applications on different physical processors.

13. One or more non-transitory computer readable storage media, having computer-executable instructions embodied thereon, wherein when executed by at least one processor, the computer-executable instructions cause the at least one processor to:

a. receive, via a network, a data stream at a controller, wherein the data stream comprises a plurality of elements being directed into a data heap, wherein the data heap comprises a binary tree in which a key value in each parent node of a plurality of parent nodes is always greater than or equal to a key value in a corresponding child node or always less than or equal to the key value in a corresponding node;

b. apply a first data heap tagging application to a first subset of the elements in the data stream, wherein the first data heap tagging application is configured to search each element in the first subset for a match to a target element, wherein the applying the first data heap tagging application comprises appending one or more of a text string, a number, or a code to the first subset of the elements;

c. if the target element match is found by the first data heap tagging application, tag the element in the first subset having the matched target element;

d. apply a second data heap tagging application to a second subset of the elements in the data stream, wherein the first subset of the elements and second subset of the elements are exclusive of each other, and wherein the second data heap tagging application is configured to search each element in the second subset for a match to the target element, wherein the applying the second data heap tagging application comprises appending one or more of a text string, a number, or a code to the second subset of the data elements, the first data heap tagging application is different from the second data heap tagging application;

e. if the target element match is found by the second data heap tagging application, tag the element in the second subset having the matched target element, wherein the applying the first data heap tagging application and second data heap tagging application are performed before each data element of the plurality of the elements in the data stream are organized into the data heap, wherein the steps (b) to (e) are performed before the data stream is catalogued and formatted into the data heap; and f. after the applying the first data heap tagging application and the applying second data heap tagging application to the elements in the data stream, storing the data stream into the data heap by sending the tagged elements from the data stream to the data heap via an application program interface.

14. The storage media of claim 13, wherein the computer-executable instructions further cause the one or more processors to run the first and second data heap tagging applications on different physical processors.

15. An apparatus for primary tagging of data, comprising:
   a. an input for receiving, via a network, a data stream comprising a plurality of elements;
   b. a first data heap tagging application executing at one or more controllers in communication with the input, wherein the first data heap tagging application is configured to append one or more of a text string, a number, or a code to a first element of the elements, to search the first element of the elements in the data stream for a match to a first target element, to tag matching elements with a first tag, and to divert an element if a match is found;
   c. a second data heap tagging application executing at the one or more controllers in communication with the input, wherein the second data heap tagging application is configured to append one or more of a text string, a number, or a code to a second element of the elements, to search the second element of the elements in the data stream for a match to a second target element, to tag matching elements with a second tag, and to divert an element if a match is found, wherein the first tag and the second tag are not a same, wherein the first data heap tagging application is different from the second data heap tagging application; and
   d. a data heap in communication with the one or more controllers and configured to receive the elements from the data stream, wherein the elements are organized into a data heap, wherein the data heap comprises a binary tree in which a key value in each parent node of a plurality of parent nodes is always greater than or equal to a key value in a corresponding child node or always less than or equal to the key value in a corresponding node, wherein the steps (b) to (c) are performed before the data stream is catalogued and formatted into the data heap;
   f. a memory comprising an instruction for storing the data stream into the data heap by sending the tagged elements from the data stream to the data heap via an application program interface.

16. The apparatus of claim 15, further comprising at least one data source configured to generate the data stream, wherein the data source is in communication with the one or more controllers.

17. The apparatus of claim 15, wherein the controller is further configured to divide the data stream into first and second data streams.

18. The apparatus of claim 17, wherein the first data heap tagging application is configured to search only the elements in the first data stream.

19. The apparatus of claim 18, wherein the second data heap tagging application is configured to search only the elements in the second data stream.

20. The apparatus of claim 19, wherein the one or more controllers comprises a plurality of physical processors, and wherein the first and second data heap tagging applications are configured to run on separate physical processors.

21. The apparatus of claim 20, wherein the first and second data heap tagging applications are configured to execute simultaneously.

22. The apparatus of claim 15, wherein the first and second target elements are the same.

23. The apparatus of claim 22, wherein the one or more controllers comprises a plurality of physical processors, and wherein the first and second data heap tagging applications are configured to run on separate physical processors.

24. The apparatus of claim 23, wherein the first and second data heap tagging applications are configured to execute simultaneously.

25. The apparatus of claim 24, wherein the first data heap tagging application is configured to search a first subset of the elements in the data stream, and the second data heap tagging application is configured to search a second subset of the elements in the data stream.

* * * * *